United States Patent
Watson

Patent Number: 5,915,336
Date of Patent: Jun. 29, 1999

[54] ANIMAL LEASH

[76] Inventor: George Watson, 79 Desjardins Drive, Winnipeg, Manitoba, Canada, R3X 1M8

[21] Appl. No.: 08/827,930
[22] Filed: Mar. 21, 1997
[51] Int. Cl.⁶ .................................................... A01K 27/00
[52] U.S. Cl. ........................................... 119/797; 119/798
[58] Field of Search .................................... 119/795, 797, 119/798

[56] References Cited

U.S. PATENT DOCUMENTS

| 4,892,063 | 1/1990 | Garrigan | 119/795 |
| 5,146,876 | 9/1992 | McPhail | 119/798 |

FOREIGN PATENT DOCUMENTS

| 426081 | 3/1935 | United Kingdom | 119/798 |
| 2264219 | 8/1993 | United Kingdom | 119/798 |

Primary Examiner—Robert P. Swiatek
Attorney, Agent, or Firm—Murray E. Thrift; Adrian D. Battison

[57] ABSTRACT

An animal leash has a strap with a fastener at one end for coupling the leash to an animal restraint and a handle at the other end for holding the leash. The strap includes a non-stretchable length of flexible material and a length of elastically stretchable webbing. The elastically stretchable section of the strap yields elastically when tensioned, to provide a more gradual application of the load and to moderate the jerk felt by those attached to both ends of the leash. The leash may include a rigid tube surrounding the length of elastically stretchable webbing and an adjacent portion of the non-stretchable webbing. The tube is secured to the second end of the length of elastically stretchable webbing. In this case, the stretchable component is housed in the rigid tube, which serves as a handle as well as a protective cover. A wrist strap may be fastened to the end of the tube.

12 Claims, 2 Drawing Sheets

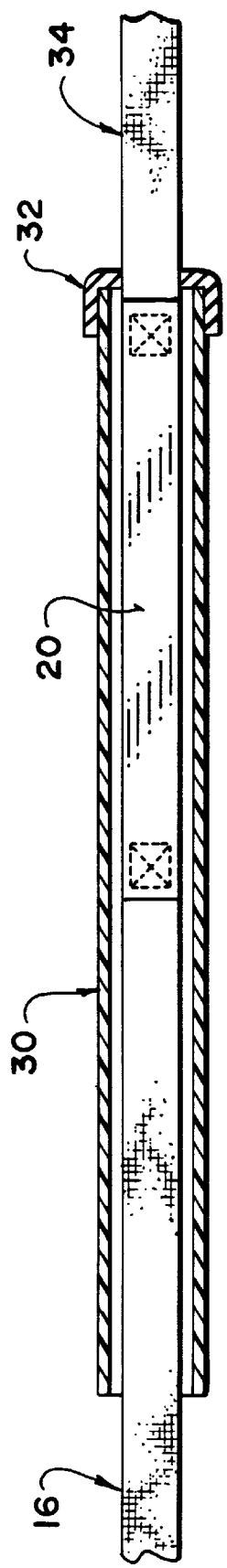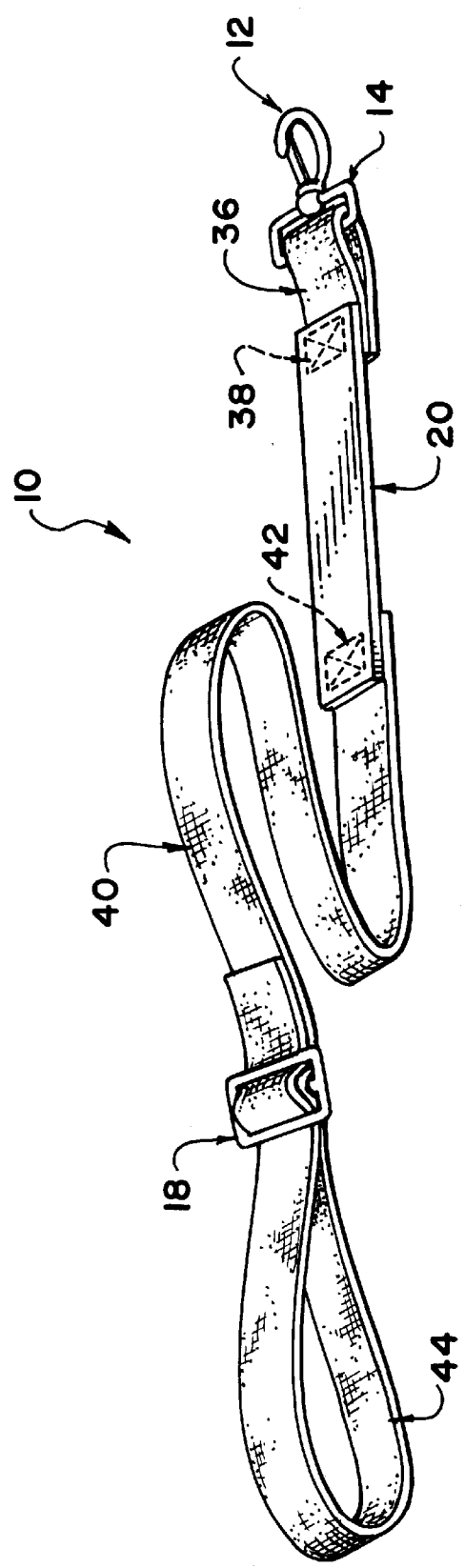

ANIMAL LEASH

FIELD OF THE INVENTION

The present invention relates to animal leashes and more particularly to a shock absorbing animal leash.

BACKGROUND

When walking large or strong animals on a leash, the animals will occasionally make a sudden movement away from the person holding the leash. This may occur, for example, if a dog pursues a cat or other animal that it is naturally predisposed to chase. The sudden movement of the animal when the leash is slack will produce a sharp jerk on the leash as soon as the maximum extent of the leash is reached. This sudden jerking is hard on the person holding the leash and may also be hard on the animal.

The present invention proposes a novel leash construction that ameliorates this problem.

SUMMARY

According to one aspect of the present invention there is provided an animal leash comprising:
  a fastener for coupling the leash to an animal restraint;
  a handle for holding the leash; and
  a strap joining the fastener and handle, the strap including:
  a non-stretchable length of flexible material; and
  a length of elastically stretchable webbing.

The elastically stretchable section of the strap yields elastically when tensioned, to provide a more gradual application of the load and to moderate the jerk felt by those attached to both ends of the leash.

According to another aspect of the present invention there is provided an animal leash comprising:
  an elongate, non-stretchable strap with opposite first and second ends;
  a fastener connected to the first end of the non-stretchable strap for coupling the strap to an animal restraint;
  a resiliently stretchable means with opposite first and second ends, the first end being secured to the second end of the non-stretchable strap; and
  a rigid tube surrounding the resiliently stretchable means and an adjacent portion of the non-stretchable strap, the tube being secured to the second end of the resiliently stretchable means.

In this case, the stretchable component is housed in the rigid tube, which serves as a handle as well as a protective cover. A wrist strap may be fastened to the end of the tube.

BRIEF DESCRIPTION OF THE DRAWINGS

In the accompanying drawings, which illustrate an exemplary embodiment of the present invention:

FIG. 3 is a cross section along line 3—3 of FIG. 2; and

FIG. 4 is an illustration of another embodiment of the leash.

DETAILED DESCRIPTION

Figure 1:
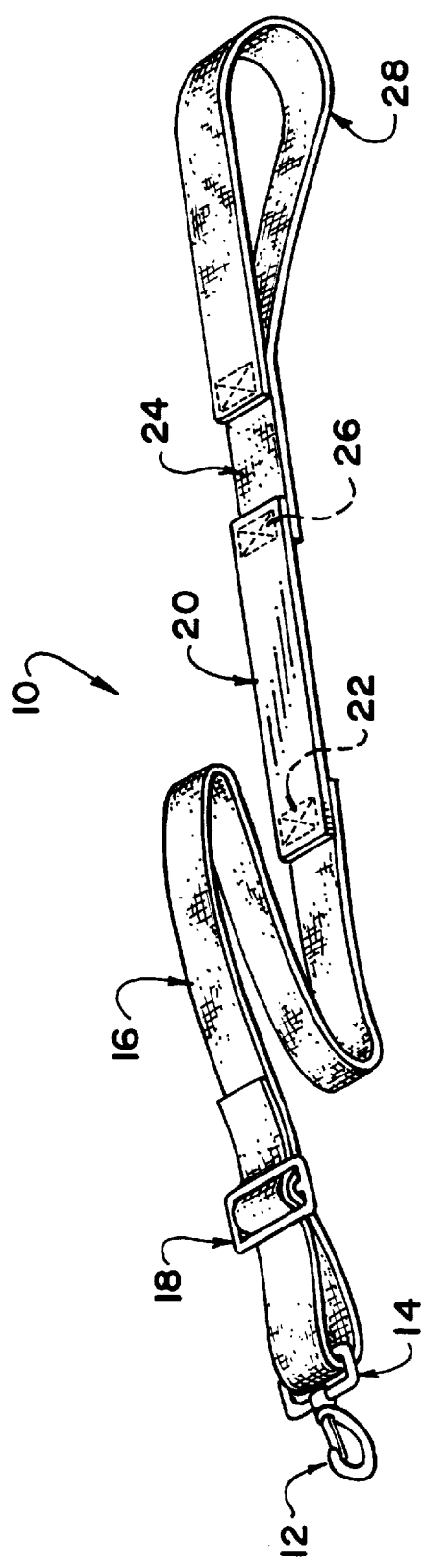
FIG. 1 is an illustration of a leash according to the present invention.

Referring to the accompanying drawings, FIG. 1 illustrates an animal leash 10 with a snap hook 12 at one end. The snap hook has a base ring 14 through which a non-stretchable, webbing strap 16 is threaded. A loop is formed in the end of the strap using a buckle 18 through which both the standing part of the strap and the end are threaded.

The other end of the strap 16 is stitched to an elastic webbing strap 20 by stitching 22. The elastic webbing is a uniaxially stretchable woven textile fabric. It has an integrated elastic material component that contracts the webbing to a relaxed length, while a non-elastic component of the webbing limits the total amount of stretch available.

A second strap of non-stretchable webbing is 24 stitched to the end of webbing strap 20 opposite that connected to strap 16 by stitching 26. The leash is completed with a wrist loop 28 of the non-stretchable webbing strap 24.

Figure 2:
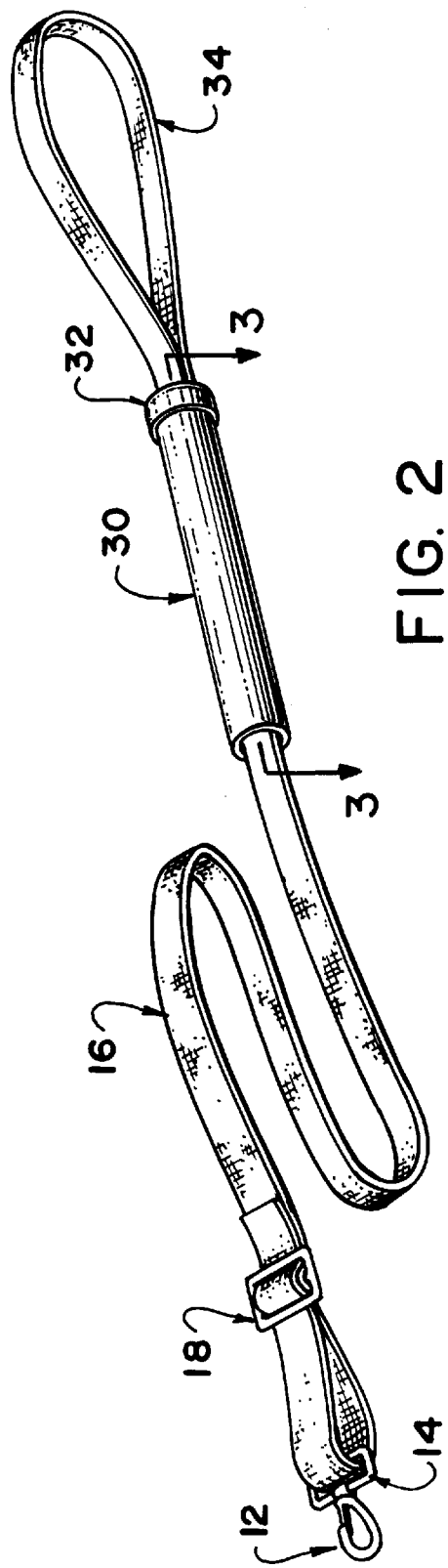
FIG. 2 is an illustration of an alternative embodiment of the leash.

In the embodiment of FIGS. 2 and 3, the elastic webbing strap 20 is surrounded by a rigid, plastic tube 30. The end of the elastic strap opposite that connected to non-stretchable strap 16 is secured to a closed end 32 of the tube. The tube 30 extends along the elastic strap and the non-stretchable strap 16 a sufficient distance that it surrounds the elastic strap and a portion of the non-stretchable strap even when the elastic strap has been stretched to its fullest possible extent. The tube thus provides a handle at the end of the leash as well as a protective housing for the elastic webbing.

A loop 34 of non-stretchable webbing is fastened to the closed end 32 of the tube 30 to serve as a wrist strap.

Referring to FIG. 4, the snap hook 12 has a short length of non-stretchable webbing strap 36 threaded through the base ring 14. A loop is formed in the strap and the ends of the strap 36 are stitched to the elastic webbing strap 20 by stitching 38. The second strap 40 of nonstretchable webbing is stitched to the end of the elastic webbing strap 20 opposite that connected to strap 36 by stitching 42. The non-stretchable strap 40 is longer than the elastic webbing strap 20. A wrist loop 44 is formed in the end of the strap 40 using the buckle 18 through which both the standing part of the strap and the end are threaded.

In use of any one of the leashes, the snap hook 12 is attached to the collar or other restraint worn by an animal and the leash is gripped using the wrist strap 28, 34 or 44, or the tube handle 30. If the animal makes a sudden movement away from the person holding the leash, the leash becomes taut, but because of the stretchability of the elastic strap 20, the sudden tensioning of the leash is cushioned to a large extent. This mitigates the considerable discomfort and possible injury that can be caused by the abrupt full loading of a conventional leash.

In the embodiment of FIG. 4, locating the elastically stretchable webbing adjacent the fastener end of the lesh allows the user to shorten up on the leash, while maintaining the shock absorbing capacity. It also limits the animal's ability to bite or chew the elastic webbing.

While specific embodiments of the present invention have been described in the foregoing, it is to be understood that other embodiments are possible within the scope of the invention. The invention is to be considered limited solely by the scope of the appended claims.

I claim:

1. An animal leash comprising:
  a fastener for coupling the leash to an animal restraint;
  a handle for holding the leash; and
  a strap joining the fastener and handle, the strap including:
    a non-stretchable length of flexible material; and
    an elastic length of flexible material consisting of an elastically stretchable webbing which consists of a unitary woven textile fabric with an elastic material component for contracting the webbing to a relaxed length and a non-elastic component for limiting the amount of stretch, the non-elastic and elastic components being integrated in the unitary woven textile fabric.

2. A leash according to claim 1 wherein the fastener comprises a snap hook.

3. A leash according to claim 1 including means for adjusting the length of the non-stretchable length of flexible material.

4. A leash according to claim 1 wherein the handle is at the end of the a non-stretchable length of flexible material, the fastener is at the end of the elastically stretchable webbing and the non-stretchable length of flexible material is longer than the elastic length of flexible material.

5. A leash according to claim 4 including means for adjusting the length of the non-stretchable length of flexible material.

6. An animal leash comprising:

an elongate, non-stretchable strap with opposite first and second ends;

a fastener connected to the first end of the non-stretchable strap for coupling the strap to an animal restraint;

a resiliently stretchable means with opposite first and second ends, the first end being secured to the second end of the non-stretchable strap; and a rigid tube surrounding the resiliently stretchable means and an adjacent portion of the non-stretchable strap, the tube being secured to the second end of the resiliently stretchable means.

7. A leash according to claim 6 wherein the fastener comprises a snap hook.

8. A leash according to claim 6 including means for adjusting the length of the non-stretchable strap.

9. A leash according to claim 6 wherein the non-stretchable strap extends outwardly from a first end of the tube and including a wrist strap comprising a flexible loop secured to a second end of the tube, opposite the first end.

10. A leash according to claim 6 wherein the resiliently stretchable means comprise a length of elastically stretchable webbing.

11. A leash according to claim 10 wherein the resiliently stretchable means include stretch limiting means for limiting the elongation of the elastically stretchable webbing.

12. A leash according to claim 11 wherein the stretch limiting means comprise a non-elastic component of the elastically stretchable webbing.

* * * * *